United States Patent [19]
Snyder et al.

[11] 3,913,129
[45] Oct. 14, 1975

[54] OUTAGE INDICATING APPARATUS FOR METER TELEMETRY SYSTEMS INCLUDING DATA RECORDERS

[75] Inventors: Carl J. Snyder; Albert H. Maxwell, Jr.; William P. Doby, all of Raleigh, N.C.

[73] Assignee: Westinghouse Electric Corporation, Pittsburgh, Pa.

[22] Filed: Sept. 26, 1974

[21] Appl. No.: 509,613

[52] U.S. Cl. ............... 360/6; 324/113; 346/14 MR
[51] Int. Cl.² ..................... G01D 9/04; G01R 13/04
[58] Field of Search ......... 360/6, 5; 346/14 MR, 20; 324/110, 113, 114, 142; 235/151.31

[56] References Cited
UNITED STATES PATENTS

| | | |
|---|---|---|
| 3,148,329 | 9/1964 | Lenahan ......................... 346/14 MR |
| 3,401,395 | 9/1968 | Neher ................................. 324/113 |
| 3,500,431 | 3/1970 | Baskin .................................... 360/6 |
| 3,531,771 | 9/1970 | Jaxheimer ...................... 346/14 MR |
| 3,678,484 | 7/1972 | Maxwell, Jr. ............................ 360/6 |
| 3,716,679 | 2/1973 | Graesslin ................................ 360/6 |
| 3,801,963 | 4/1974 | Chen ....................................... 360/5 |

Primary Examiner—Terrell W. Fears
Assistant Examiner—Jay P. Lucas
Attorney, Agent, or Firm—R. W. Smith

[57] ABSTRACT

An outage in a quantity measured by a meter develops a signal in a data recorder included in a telemetry system to record data signals initiated by the meter. The data signals and time interval signals are recorded as pulses in separate data and time tracks in a recording medium. An outage pulse is recorded in the time track in an immediately adjacent relationship prior to the recording of an interval pulse. The outage pulse is positioned for detection in a translator upon a reverse direction of translation of the data and interval recorded pulses so as to indicate the time of the outage condition.

8 Claims, 4 Drawing Figures

OUTAGE INDICATING APPARATUS FOR METER TELEMETRY SYSTEMS INCLUDING DATA RECORDERS

CROSS-REFERENCE TO RELATED APPLICATIONS

This invention is related to U.s. Pat. applications Ser. No. 509,612 by W. P. Doby et al, and Ser. No. 509,614 by W. P. Doby both filed concurrently with this application.

BACKGROUND OF THE INVENTION

This invention relates to utility metering telemetry systems including a recorder for recording an outage condition along with meter data and time interval information and more particularly to such systems in which the outage is recorded as a pulse in a predetermined position prior to an interval pulse in a common time recording track to indicate the time of the outage condition during data translation.

The recording of utility meter readings for extended periods in the order of a month for later translation and calculation of power demand, billing and load survey information of electric utility customers is well known. In U.S. Pat. No. 3,059,239 issued to C. J. Snyder on Oct. 16, 1962; U.S. Pat. No. 3,148,329 issued to B. E. Lenehan on Sept. 8, 1964; U.S. Pat. No. 3,189,821 issued to A. J. Petzinger on June 15, 1965; and U.S. Pat. No. 3,470,470 issued to C. J. Snyder on Sept. 30, 1969, all assigned to the assignee of this invention, magnetic recording devices are described and claimed for recording watthour meter or other meter data pulses and time interval pulses. These recorders are operated continuously for extended periods corresponding to monthly billing periods or monthly periods for accumulating meter pulse data for measured quantities such as wind direction as disclosed in U.S. Pat. No. 3,665,759 issued to T. J. Daley on May 30, 1972 and assigned to the assignee of this invention. In U.S. Pat. No. 3,602,458 issued to W. P. Doby et al on Aug. 31, 1971 and assigned to the assignee of this invention, tape cartridge capable of operating for extended recording periods is described and claimed. As noted in these patents, when the beginning and end times of the recording period is known an exact time record of the occurrence of the meter data information is known by correlating real time to the recorded time pulses. Power consumption, maximum demand billing, and peak load information are conveniently calculated from the record tapes, for example, when the recorded data pulses represent kilowatts of power usage by a customer's electric load.

Translation of the recorded data is preferably provided in a translator as described and claimed in U.S. Pat. No. 3,678,484 issued to A. H. Maxwell, Jr. on July 18, 1972 and in U.S. Pat. No. 3,740,724 issued to C. J. Snyder on May 14, 1971 both assigned to the assignee of this invention. The recorded tape in a tape cartridge, as disclosed in the Doby et al U.S. Pat. No. 3,602,458 is rewound and the data is read into the translator in a reverse direction relative to the recorded direction. The translator includes a counting operation to totalize the data pulses recorded on one or more data recording tracks between the time interval pulses. The totalized pulse information along with identifying and other programmed information associated with the data pulses is provided at the output of the translator as described in the Maxwell, Jr. U.S. Pat. No. 3,678,484. The translator output may be provided on computer tape or punched cards for subsequent processing in a commercial computer or provided directly to the input of the commercial computer or also provide a direct teleprinter print-out of billing or other desired power usage data.

One problem that has been noted in some instances is the occurrence of power outages during the metering of the electric power consumption in the aforementioned recorder telemetry systems. When the power outage occurs, the recorder stops and then starts again at the end of the outage. The recorded data and interval pulses appear the same whether there is an interruption in the recording or not. In the U.S. Pat. 3,538,406 issued to C. J. Snyder on Nov. 3, 1970, and assigned to the assignee of this invention, a battery powered data recorder is disclosed and claimed. Also, a battery carryover feature may be included in the recorders to operate the recorder from a battery only during power outages. This continues and maintains the tape movement so that all time pulses are recorded over an extended period even when several outages occur. Since no power is being measured the data recording tracks will be blank. The interval between time pulses can be preselected and in one typical embodiment is 15 minutes. This permits the proper time reference to be maintained during translation of the record tapes recorded when power outage conditions occurred in the power system being monitored.

Without the battery carryover recorder feature the system user typically has a separate record of the time of the outage. When this is know, the times assigned to the data following the outage can be adjusted to approximately compensate for the outage. The accuracy of this compensation is limited to the time between interval pulses on the tape. For example, with a 15 minute interval data recorder, interval pulses following the outage are adjusted in 15 minute increments. Therefore, unless the outage was an even multiple of 15 minutes, the adjusted reading may lag real time by as much as 15 minutes. For many cases this time discrepancy is not important and the data may still be used. In cases where this time difference prohibits use of the data, it is still convenient to know when the power outage occurred so that the data to that point may be accepted and the data following it may be discarded. This procedure becomes difficult to implement and loses its accuracy when two or more outages occur in one month.

Accordingly, it is desirable to have an indication of a power outage condition recorded on the recording tape. The length of the outage will be known so that the translating computing apparatus may be adjusted to compensate for the outage condition and maintain the translated data in the proper relationship. In Pat. application Ser. No. 509,612 by W. P. Doby et al an outage pulse is recorded in the time track recording track at a predetermined location adjacent a time interval pulse. The outage pulse is specifically described as being recorded immediately prior to an interval pulse. Upon translation the outage pulse is read first and triggers the translator circuits as an interval. Since the outage pulse is out of the normal interval pulse time position error is introduced into the translation process without extensive modification of the translator circuits. In some instances this error is not desirable or within permissible translation variation.

SUMMARY OF THE INVENTION

In accordance with the present invention outage indicating apparatus is included in a utility metering telemetry system including a data recorder that records data pulses and time interval pulses and further records outage pulses. Outage indicating apparatus in the data translator indicates the time of outage conditions in response to reading a recorded outage pulse. This permits adjusting the translated data to maintain the proper time orientation of the translated data following a power outage condition.

In a preferred embodiment, an outage condition is recorded as an outage pulse at a predetermined position prior to a time interval pulse. An outage impulse control element is connected in the outage indicating circuit and a time impulse control element is connected in a time recording circuit. The outage impulse control element is actuated at regular intervals at the same rate as is the time impulse control element. The time impulse control element is effective to generate a current signal through a time interval recording head circuit and produce a recorded time interval pulse in the recording medium. The recorder outage indicating circuit is connected to be responsive to the presence of the quantity being measured such that a switching control member is rendered to a first conducting condition when the measured quantity is present and is rendered to a second and opposite conducting condition when there is an interruption or an outage in the presence of the measured quantity. When the switching control member is operated between the first and second conducting conditions in response to an outage condition, the outage impulse control element is effective upon return of the meeasured quantity to apply a current signal to the time recording head. An outage pulse is recorded in the time recording track including the time interval pulses. While the measured quantity is continuously present, the first conducting condition of the switching control member renders the outage indicating circuit inactive to prevent a recorded outage pulse in response to actuation of the outage impulse control element. The time impulse and outage impulse control elements are actuated at different predetermined times such that an outage pulse is recorded before an interval pulse on the recording medium. The predetermined spacing is within one-tenth of the interval spacing between time interval pulses and a recorded position approximately 5 percent before the end of an interval following an outage condition is preferred.

A translator operated in accordance with this invention includes apparatus including an outage indicating circuit responsive to sensing an inverval pulse and an outage pulse within a predetermined time slot including the predetermined spacing between the recorded interval and outage pulses. The translator outage indicating circuit produces an outage indicating signal to indicate that an outage condition occurred relative to a recorded interval pulse during translating processing of the meter data information.

It is an important feature of this invention to provide a utility metering telemetry system for monitoring electric power consumption of a customer's electric load and having a data magnetic recorder for recording watt demand indicating data pulses in one recording track and time interval pulses in a time track with outages in the measured electric power being recorded in the time track before an interval pulse. A further feature of this invention is to record an outage pulse in the time track of a data recorder subsequent to an outage condition and at a predetermined recorded position in the order of five percent before a recorded interval pulse with the interval and outage pulses being magnetically recorded in a return-to-bias (RB) mode while data pulses are magnetic recorded in a nonreturn-to-zero (NRZ) mode. Another feature of this invention is to provide a data translating system for selectively processing both time interval pulses and an outage pulse recorded in the same track of a recording medium. Other advantages and features will be apparent from the detail description of the drawings hereinbelow.

DESCRIPTION OF THE PREFERRED EMBODIMENTS

Figure 1:
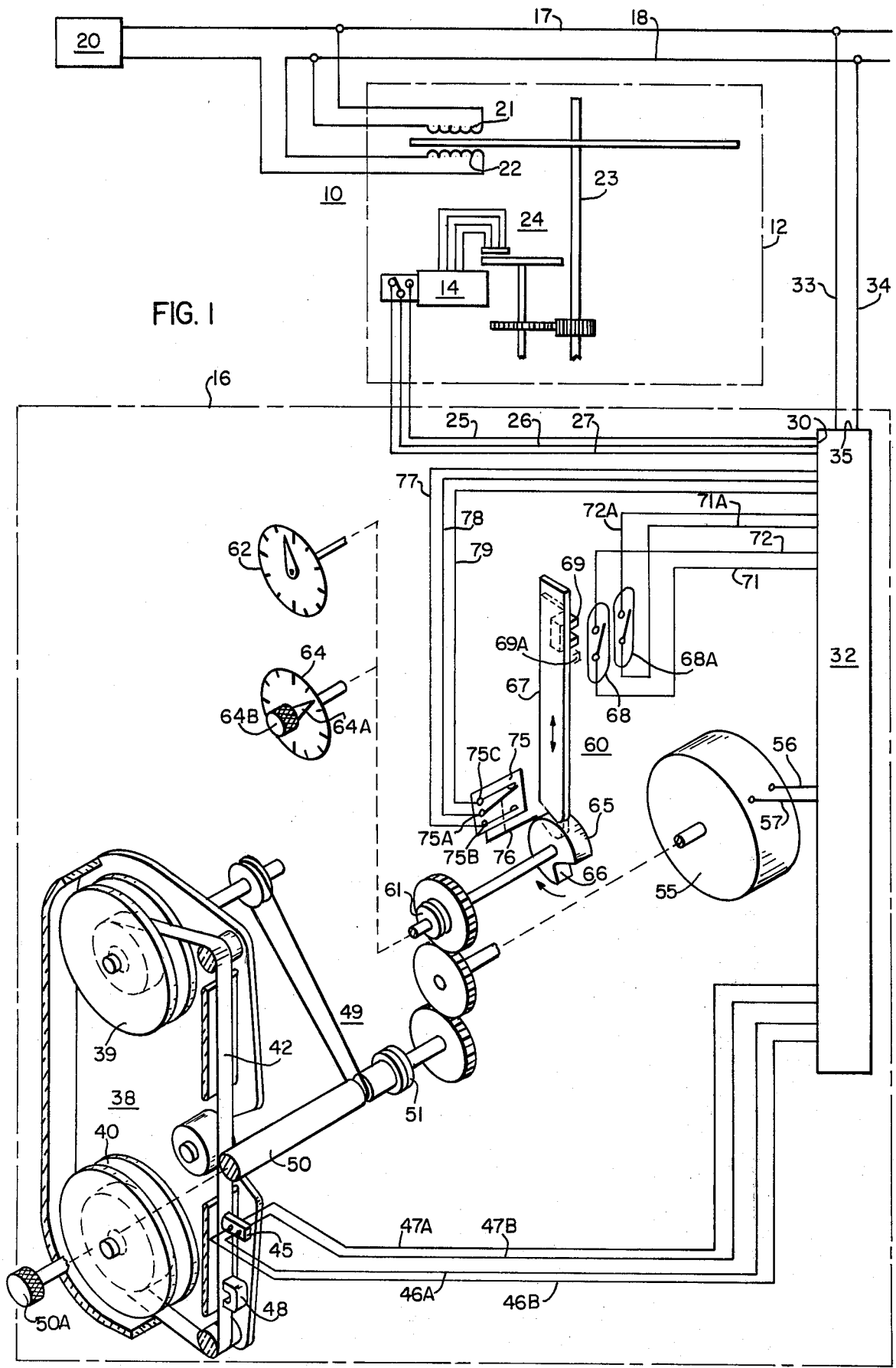
FIG. 1 is a schematic view of a utility metering telemetry system including a data recorder having parts shown in perspective and including outage indicating apparatus made in accordance with this invention.

Referring now to the drawings wherein throughout the several figures the same numeral designates the same or like elements and more particularly to FIG. 1 wherein there is shown a telemetry system 10 including an electric utility meter 12 provided by an integrating induction type watthour meter, a pulse generator 14 associated with the meter 12, and a data recorder 16 made in accordance with the present invention. The quantity of electric power supplied from a utility company through conductors 17 and 18 to a customer's electric load 20 is measured by the meter 12. The voltage winding 21 and current winding 22 of the meter 12 are connected to the conductors 17 and 18 in a well-known manner. The meter disc shaft 23 is driven at a rate proportional to the rate of consumption of electrical energy by the load 20. The pulse generator 14, includes a radiometic pulse initiator as disclosed and claimed in U.S. Pat. No. 3,722,493 issued to T. M. McClelland, III on May 15, 1973 and commercially available as a Type CD-22 photoelectric pulse initiator described in descriptive bulletin I.L. 42-570 dated December, 1971 and available from Westinghouse Electric Corporation, Meter Division, Raleigh, North Carolina. Other known three-wire contact devices which are operative to alternately effect contact closures between a common terminal and two oppositely poled terminals connected to the ends of three conductors 25, 26 and 27 at the pulse generator 14. The other ends of the conductors 25, 26 and 27, forming a so-called three-wire telemetry circuit, are connected to a data input 30 of the recorder 16.

The data recorder 16 is a modified form of the demand magnetic tape recorder described in descriptive bulletin I.L. 42-565WR-2 dated April, 1972 and available from Westinghouse Electric Corporation, Meter Division, Raleigh, North Carolina. The recorder includes the general features of the recorders described in the aforementioned descriptive bulletin except for the inclusion of the outage indicating apparatus of this invention. For a better understanding of this invention, the general features of the recorder are described hereinafter.

The three-wire telemetry conductors 25, 26 and 27 are connected to the data input 30 of the recorder circuits 32 illustrated as a circuit block in FIG. 1 and described in detail in connection with the description of FIG. 2 hereinbelow. The recorder circuits 32 are supplied electric power from the conductors 17 and 18 supplying the 60 Hz electric power quantity to the load 20 which quantity is measured by the meter 12. The conductors 33 and 34 are connected between the recorder power input 35 and the conductors 17 and 18. A tape cartridge 38 as described in the aforementioned Doby U.S. Pat. No. 3,602,458 includes a take-up reel 39 and supply reel 40 carrying a recording medium formed by a magnetic tape 42. The tape a length of slightly over 500 feet is capable of recording for an extended period of approximately 36 days with time interval pulses recorded at fifteen minute intervals as described hereinbelow. To provide the month long recording the tape 42 has a speed of 7 inches per hour. The cartridge 38 is removable from the recorder 16 to be transported to a central data translating center having a translator system also described hereinbelow.

A data magnetic record circuit and a time interval magnetic record circuit, respectively, are connected to a single plural track recording head 45. Wire conductors 46A and 46B conduct data pulse current signals and wire conductors 47A and 47B conduct time interval pulse current signals produced in the circuits 32 to the magnetic record circuits of the head 45. A permanent magnet 48 is positioned adjacent the tape 42 to magnetically saturate the tape in one direction or polarity of magnetization. The tape is magnetized before passing the record heads.

A tape drive mechanism 49 drives a capstan 50 through a one-way clutch 51. A knob 50A on the capstan 50 advances the tape 42 for initial tape positioning. The mechanism 49 is driven by a gearing arrangement 53 driven from a synchronous timing motor 55. The motor 55 is energized from the recorder circuits 32 through conductors 56 and 57. A recorder timing mechanism 60 is driven from a second one-way clutch 61 and includes a clock 62, an interval indicator 64 with a pointer 64A fixed to an interval knob 64B. The timing mechanism 60 initiates time interval signals and outage signals in the recorder circuits 32 as described hereinbelow. A circular interval cam 65 is driven commonly with the clock 62 and the interval indicator 64. A cam slot 66 in the edge of cam 65 releases a cam follow 67 engaging the periphery of the cam 65 from an upper position shown in solid lines to a lower position shown in broken lines.

A time interval impulse control element includes a magnetically responsive, normally open, reed switch 68 and a permanent magnet 69 carried by the cam follower 67. The magnet 69 is positioned so that the reed switch 68 is in a non-conducting operative state when the magnet 69 is in the upper position and it is in a conducting operative state when the magnet 69 is in the lower position as indicated by the broken lines 69A. The contacts of the reed switch 68 are connected to the recorder circuits 32 by the conductors 71 and 72.

In accordance with the present invention, an outage impulse control element is formed by a single pole double throw microswitch 75 including an actuator 76 engaging the periphery of the cam 65 to be operated as a cam follower element. The conductors 77, 78 and 79 connect the contacts of the switch 75 to the recorder circuit block 32. The actuator 76 is positioned so that the clockwise rotation of the cam 65 causes the cam slot 66 to operate the actuator 76 to a lower position and operate the switch 75 between alternately closed states between the common switch terminal 75A and the terminals 75B and 75C. A further control element for the recording of an outage impulse is provided by a second reed switch 68A operated by the cam follower magnet 69 at the same instant and in the same manner as is the reed switch 68. Conductors 71A and 72A connect the switch 68A to the recorder circuits 32.

Figure 2:
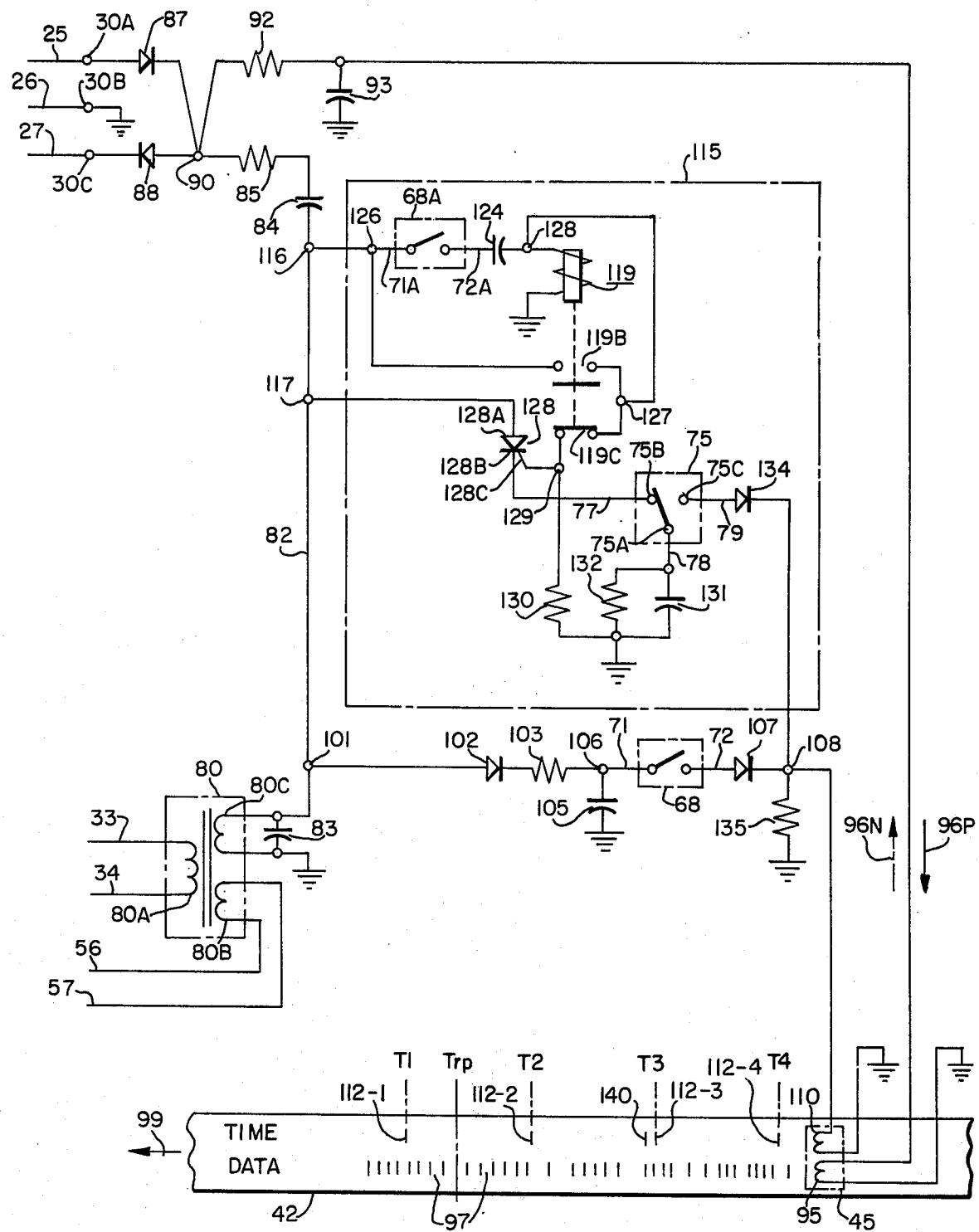
FIG. 2 is an electrical circuit diagram of one preferred form of the recording circuits included in the data recorder illustrated in FIG. 1.

Having described the principal parts of the recorder 16 reference is now made to FIG. 2 illustrating a detail electrical diagram of the recorder circuits 32. A recorder power supply 80 is formed by a transformer having a primary winding 80A connected to the conductors 33 and 34. Typically, 120 or 240 volts occurring across the conductors 17 and 18 is applied across the primary winding 80A. Two secondary windings 80B and 80C are provided such that the winding 80B is connected to the conductors 56 and 57 to supply an appropriate voltage to the timing motor 55. The 60 Hz output of the power supply 80 controls the speed of the timing motor 55 to correspond to the frequency of the electric power in the load conductors 17 and 18 since it is a synchronous type motor.

The secondary winding 80C provides an alternating current electric source at a predetermined voltage for the recorder data, time interval, and the outage recording circuits. A supply conductor 82 is connected to one terminal of the winding 80C and the other terminal thereof is connected to the circuit ground. A filter capacitor 83 is connected across the secondary winding 80C. The conductor 82 is connected through a capacitor 84 and resistor 85 to the data recording circuit.

The terminals 30A, 30B and 30C at the data input 30 are connected to the conductors 25, 26 and 27, respectively, from the three-wire contact device of the meter pulse generator 14. One of oppositely poled ends of diodes 87 and 88 in the data recording circuit are connected in series with the terminals 30A and 30C respectively. The terminal 30B is connected to the common circuit ground. The remaining ends of the diodes 87 and 88 are connected together and to the junction 90 for connection to the supply conductor 82. The junction 90 is connected through a filtering circuit including resistor 92 and capacitor 93 to the conductor 46A and a coil 95 of the data magnetic record circuit of the head 45. The conductor 46B connects the other end of the coil 95 to the circuit ground to complete the data magnetic record circuit.

The diodes 87 and 88 rectify the supply current of conductor 82 so that with each predetermined quantum of kilowatts measured by the meter 12, the position of the three-wire contact device is changed and latched in position to initiate a new data impulse in the recorder. Accordingly, as the pulse generator 14 effects a latched contact connection between terminals 30A and 30B, current in the direction of directional arrow 96P flows through the data head coil 95. This is because diode 87 grounds the negative half wave of the winding 80C current output and causes the positive half wave current at the junction 90 to flow into the coil 95. When the terminals 30B and 30C are connected together by the next data output impulse of the pulse generator 14, the diodee 88 grounds the positive half wave current appearing at the junction 90. Thus, negative half wave current is supplied through the data record coil 95 as indicated by the directional arrow 96N. Accordingly, data pulses 97 are recorded in a non-return-to-zero (NRZ) fashion in the data track of the magnetic tape 42 when it is fed in the direction of directional arrow 99 in the recorder 16 as illustrated at the bottom of FIG. 2. Thus, each of the pulses 97 represents a transition between opposite polarity magnitized portions in the data track of the magnetic tape 42. As noted hereinabove, the tape is premagnetized in one polarity of magnetization by the magnet 48 shown in FIG. 1. At least two additional data tracks may be recorded by providing additional data inputs such as input 30 and the associated circuitry including additional data recording head circuits to provide plural data channel recording.

Referring now to the time interval recording circuit portion of the recorder circuits 32, the junction 101 of the supply conductor 82 is connected in series with the diode 102, voltage dropping resistor 103, a resistor 104 and the reed switch 68, which is connected between the conductors 71 and 72. A storage capacitor 105 is connected at the junction 106 at one contact of the switch 68 and the circuit ground. The other contact of the switch 68 is connected in series with the diode 107 and a circuit junction 108. The conductors 47A and 47B connect a time interval magnetic record coil 110 of the record head 46B in series with the junction 108 and the circuit ground.

During rotation of the interval cam 65 shown in FIG. 1 in a clockwise direction, the contacts of the reed switch 68 are periodically closed to control the timing of the time interval pulses 112-1, 112-2, 112-3, 112-4 produced in the time track of the magnetic tape 42 as shown in FIG. 2. While the reed switch is in an open state the capacitor 105 is charged from the half wave rectified current applied from the junction 101 and through the diode 102. The capacitor 105 is discharged through the interval recording head coil 110 when the reed switch contacts are closed. This produces a very short duration return-to-bias (RB) recorded interval pulses 112-1, 112-2, 112-3 and 112-4 at the real times T1, T2, T3 and T4, respectively, in the time track. These times are recorded at fifteen minute intervals in the exemplary preferred embodiment disclosed herein, however, other time intervals may be provided. The recorded time intervals correspond to watt demand metering intervals which are understood by those skilled in the art of utility power demand metering.

A power outage indicating recording circuit portion, included within the broken-line circuit block designated by the numeral 115, is connected between the junctions 116 and 117 of the supply conductor 82, and the junction 108 in the time interval recording circuit portion. An outage detection device is formed by a switching control member including a relay 119 included in the outage indicating circuit 115. A relay coil 119A controls the relay switch contacts 119B and 119C having the nonconducting and conducting states shown in FIG. 2 when the coil 119A is unenergized. One branch of the circuit 115 includes the junction 116 connected in series with the conductors 71A nd 72A and, therefore, in series with the contacts of the reed 68A. A capacitor 124 is connected in series with the relay coil 119A and the circuit ground. The normally open relay contacts 119B are connected through the circuit junction 126 to the supply conductor 82 at junction 116. A common terminal 127 between the contacts 119B and 119C is connected to a circuit junction 128 between the capacitor 124 and the relay coil 119A. The contacts 119B form latching or holding contacts for the coil 119A across the switch 68A.

A second branch of the outage indicating circuit 115 is connected to the circuit junction 117 and includes a solid state switching device 128 of the solid controlled rectifier (SCR) type including anode 128A, cathode 128B and gate 128C electrodes. The anode 128A is connected to the junction 117 and the cathode is connected by the aforementioned conductor 77 to one contact 75B of the microswitch 75. The gate 128C is connected to the circuit junction 129 between the contacts 119C and a resistor 130 also connected in series with the circuit ground. The common terminal 75A of the microswitch 85 is connected by the aforementioned conductor 78 to a storage capacitor 131 which is further connected to the circuit ground. A resistor 132 is further connected in parallel with the capacitor 131. The second contact terminal 75C of the microswitch 75 is connected by the aforementioned conductor 79 to a diode 134 connected in series with the circuit junction 108 and the time recording head coil 110. A resistor 135 is connected across the junction 108 and the circuit ground. If desired, a time delay circuit feature may be connected with the coil 119A as disclosed in the aforementioned copending application Ser. No. 509,612 to prevent operation of the coil 119A by momentary power outages in the order of 4 to 5 seconds.

In operation of the outage indicating circuit 115, a power outage condition is assumed to have occurred for purposes of this description in the conductors 17 and 18 in FIG. 1 during a real time interval following the time T1 when the interval pulse 112-1 was recorded on the magnetic tape 42 shown in FIG. 2. This stops the movement of the tape 42. The initial real time at the beginning of the power outage is not indicated and the time Trp represents the real time of return to power or the end of the power outage. It is assumed for purposes of this description that an outage of five minutes duration occurs. A recorded power outage pulse 140 is provided in the time track at a predetermined time of approximately 5 percent of the time interval prior to the second interval pulse 112-3 (at the time T3) to be recorded in the first complete interval after the return to power at time Trp.

Upon initial installation of the recorder 16 equipped with the outage indicating circuit 115, the interval knob 64B must be turned through an interval (normally occurring anyway when initially setting the clock 62) after the recorder circuit power supply 80 is energized. The foregoing initial procedure avoids a false indication of a power outage and initially energizes the relay coil 119A. The relay 119 is operated to reverse the conductive conditions of contacts 119B and 119C. The relay contact 119B is closed to act as a holding or latching contact such that the relay coil 119A is maintained energized while the reed switch contacts of the switch 68A open and close during each interval. Thus, the contacts 119C and 119B are placed in the open and closed states, respectively. The contact associated with terminal 75C of the microswitch 75 is closed for 95 percent of an interval and are open at the point of 5% before the start of an interval and then reclose during each rotation of the interval cam 65. The reed switch 68 A is closed simultaneously with the reed switch 68 when one of the time interval pulses is recorded. The SCR 128 will not be conductive since the gate 128C will be held at the circuit ground potential.

Upon loss of power, the relay coil 119A will deenergized and the contacts 119B and 119C open and close, these conditions being shown in FIG. 2. The tape stops and no pulses are recorded while the outage continues.

When AC power resumes, at the time Trp, the tape 42 starts again after being stopped. The coil 119A does not energize because the contacts of the reed switch 68A are open. At time T2 the time interval pulse 112-2 is recorded as the reed switch 68 is operated by rotation of the cam 65. Operation of the microswitch 75 immediately prior to the operation of both of the reed switches 68 and 68A will not record a outage pulse since the capacitor 131 will be in a discharged state since it was isolated even prior to the outage condition by the non-conductive SCR 128. As the reed switch 68A is closed also at time T2, current from the conductor 82 produces a pulse through the capacitor 124 to the relay coil 119A. The leading edge of the pulse passing to the coil 119A also passes through the closed contacts 119C to gate the SCR 128 to conduction before the coil 119A is energized sufficient to operate the contacts 119C and 119B. The SCR 128 is held conductive after the contacts 119B are closed and the contacts 119C are opened by the energized coil 119A by the anode to cathode current of the SCR 128 passes through the microswitch 75 and the resistor 132. The capacitor 131 is charged from the conductor 82 and through the SCR 128 and contact 75A of the microswitch. The condition just described continues until just prior to the real time T3 before the microswitch is operated.

When the microswitch 75 is subsequently operated, the capacitor 131 discharges through the switch terminal 75B and the time interval recording head coil 110 to record the outage 140 at approximately 5 percent of the interval prior to the interval pulse 112-3 at the time T3.

It is noted that the interval pulse 112-2 occurring at the real time T2 will be spaced at the normal interval distance from the previous interval pulse 112-1 which occurred at time T1 prior to the outage condition. The distance between the interval pulses 112-1 and 112-2 occurring at times T1 and T2 indicate a 15 minute interval in the example described herein, however, the real time that elapsed between these times is 15 minutes plus the duration of the outage, i.e. 5 minutes. The time of occurrence will be known by the utility company. Also, the duration of a single outage can be computed by noting the difference between the time indicated by the recorder clock 22 and real time. For example, the tape recorded interval pulse 112-1 at time T1 can represent a real time of 8:00 and the interval pulse occurring at T2 and T3 and T4 would in the absence of an outage, represent the times 8:15, 8:30 and 8:45 except that the outage condition changed these to actually indicate 8:20, 8:25 and 8:50. Therefore, all of the interval pulses after time T1 will have to be assigned new time values in accordance with the duration of the outage condition so as to represent the corresponding real times.

Figure 3:
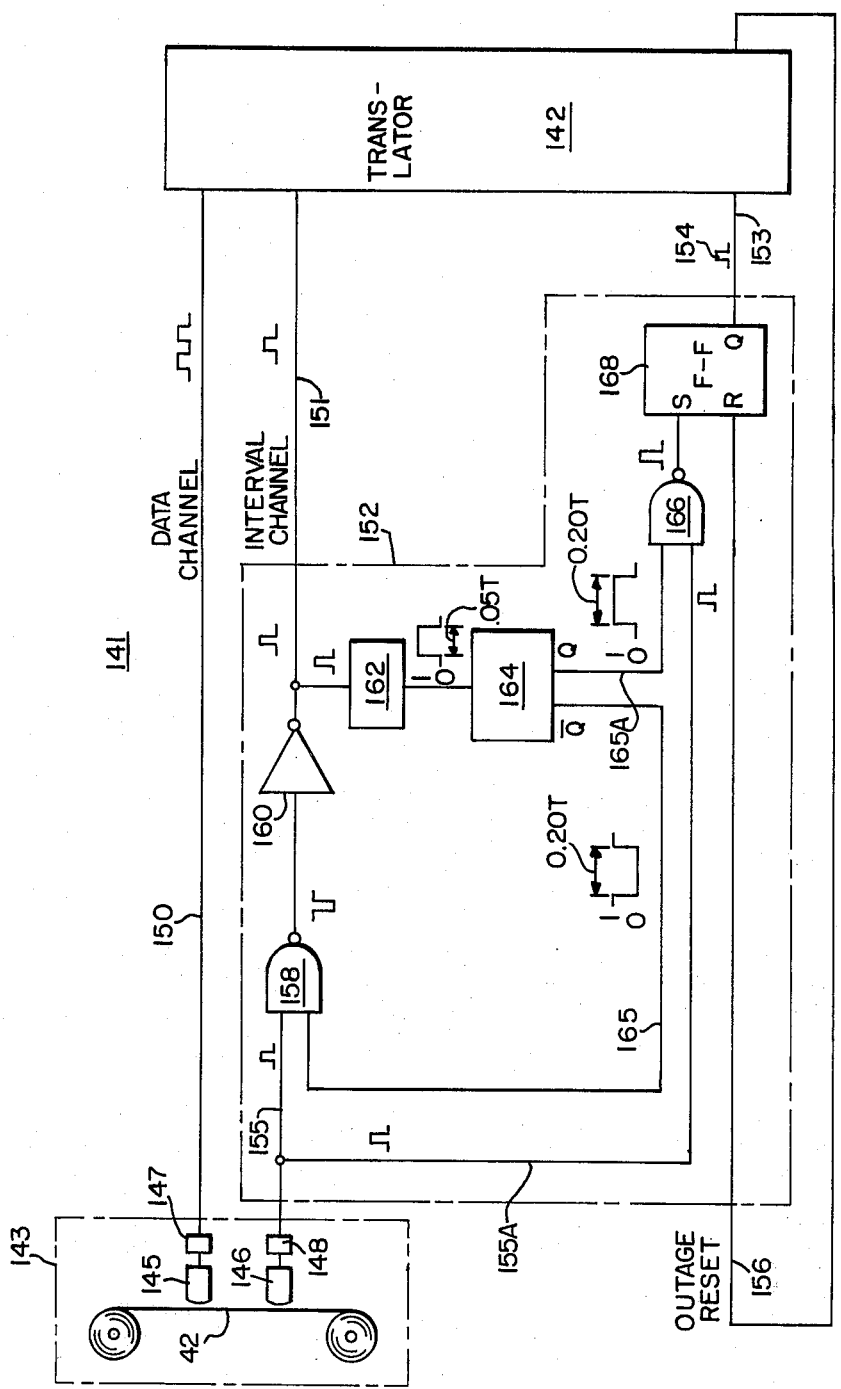
FIG. 3 is a schematic view of a data translator arrangement including apparatus made in accordance with this invention for processing the recorded outage indications provided on the recorder recording medium.

In FIG. 3 there is illustrated an electric schematic diagram of a translator system 141 for processing the recorded outage indication formed by the outage pulse 140 described hereinabove in connection with FIG. 2. The translator system 141 includes a playback deck 143 and a translator arrangement 142 operated, for example, substantially in accordance with descriptions in the Snyder U.S. Pat. No. 3,740,724 and Maxwell, Jr. U.S. Pat. No. 3,678,484 noted hereinabove. The cartridge 38 having the magnetic tape 42 recorded as shown in FIG. 2, is mounted to a playback deck 143 of the translator system 141 for readout of the recorded data pulses, interval pulses and outage pulse. Accordingly, the pulses of the tape 42 are sensed in the reverse order that they were recorded. The data pulses and time interval pulses are processed, for example, as described in the last-named Snyder and Maxwell, Jr. patents. Accordingly, a data magnetic pickup head 145 and interval magnetic pickup head 146 sense the pulses in the recorded data and time tracks and the associated pulse shapers 147 and 148 develop pulses in the data input channel 150 and interval input channel 151 for application to the anticoincident and counter circuits in the translator arrangement 142. A time interval pulse initiates each interval readout sequence.

An outage indicating circuit 152 is provided in accordance with this invention and is connected to the interval input channel 151 and also includes an outage indicating signal output line 153 providing data bit signal 154. When the translator arrangement 142 includes a small general purpose computer corresponding to the Hewlett-Packard Model 2114B noted in the Snyder U.S. Pat. No. 3,740,724, the translator includes interface circuits including an anticoincident circuit and counter circuits. The output drive lines from these counter interface circuits as described in this last-named Snyder patent include a predetermined number of data bit positions for input to the input/output (I/O) section of the a predetermined number of bit positions for providing the binary count of data pulses occurring in the data track between consecutive interval pulses. In accordance with this invention, an additional data bit position is provided at the driver line outputs of the interface circuits to signal the translator computer of the outage condition in response to the recorded outage pulse 140.

To implement translator processing of the outage indicting signal 154 in the interface circuits disclosed in the aforementioned Snyder patent, an additional latch circuit, counter select gate (for each of the plural data channel counters) and a driver gate will be added. The output of the translator arrangement 142 is typically placed on a computer tape for subsequent processing by a commercial billing computer operation, and an extra character slot is added to the four slots provided for recording on the computer tape the count of the data tracks or tracks of the field recording tape 42. The programmable translator arrangement 142 is appropriately conditioned to receive the outage indicating signal 154.

The outage indicating circuit 152 is included in the aforementioned translator interface circuits. An input line 155 is connected thereto from the interval pulse shaper 148. An outage reset line 156 is applied as an input to the circuit 152 from the translator arrangement 142 to reset the circuit 152 after receipt of the outage indicating signal 154 on the line 153 to the translator arrangement 142.

The outage indicating circuit 152 is operated as the tape 42 is read and interval pulses are sensed by the interval pickup head 146. It is to be noted that the recorded outage pulse 140 will be sensed 90 to 97 percent of an elapse interval and after the internal pulse 112-2 or immediately before the pulse 112-3. The circuit operation blocks the inverval channel 115 to the translator arrangement 142 corresponding to the data input designated by the numeral 58 in U.S. Pat. No. 3,740,724. The blocking period is for a predetermined time immediately after a recorded interval pulse is read by the interval pickup head 146. a two input NAND gate 158 has one input connected to the input line 155 from the time interval pickup head 146. The other and enabling input to the gate 158, as described below, is normally in the enabled or one state. The output of the gate 158 is applied through an inverter gate 160 to invert the logic state output of gate 158 for applying it to the interval channel 151 and to the interface circuits of the translator arrangement 142 as described in the aforementioned U.S. Pat. No. 3,740,724.

The output of gate 160 is also applied to a monostable multivibrator circuit 162. The monostable multivibrator 162 has a monostable period equal to 0.025T of a time period T where T is the normal time between interval pulses occurring at the interval pickup head 146. Thus, the time period T is established by the spacing of the interval pulses on the tape 42 and the speed of the tape in the playback deck 143. A translation tape speed of 30 inches per seconds is typical so that time interval pulses recorded every fifteen minutes are read every 60 milliseconds in the play back deck 143. The end of the period of the multivibrator 162 starts the "window" which is provided to look for a second pulse immediately following a first pulse in the time track. The output of the multivibrator 162 goes from 0 state to the 1 state for the 0.025T time and is applied to the input of a second monostable multivibrator circuit 164 which has $\bar{Q}$ and Q outputs. A 1 state is normally at the $\bar{Q}$ output and a 0 state is normally at the Q output. These outputs reverse their logic states for the monostable period of 0.10T which is the period that the window is open so as to block the interval channel 151 to the immediately following outage pulse 140 in the interval track. The Q output is connected by line 165 to the enabling input of the gate 158 and goes from the 1 to the 0 logic state for 0.10T to inhibit the gate 158 and prevent any pulse from going on through to the normal interval input channel 151 of the translator arrangement 142.

The Q output of the one shot 164 is connected by line 165A to the enabling input of a NAND gate 166. The 0 to 1 transition for 0.10T time period enables the gate 166 so that a pulse from the line 155A can pass to trigger the output of the gate 166 from the interval pickup head 146. A set-reset flip-flop circuit 168 receives the output from the gate 166 at the set input thereof. The reset input to the flip-flop 168 is connected to the reset line 156 from the translator arrangement 142. A Q output of the flip-flop 168 provides the translator outage indicating signal 154 on the line 153 to the translator arrangement 142 when in the reset state so that the pulse on line 165 is gated through the gate 166. Thus, the readouts from the translator interface circuits to the small translator computer will include binary count of the data signals which is initiated by the recorded outage pulse 140 occurring at the interval pickup head 146. Further, a binary signal having a predetermined position corresponding to the outage indicating output slot will be read concurrently to the small computer inputs along with the data pulse count. The blocking and stage indication gating operation of the circuit 153 commences at the short 0.025T time read-in period after a pulse in the time track occurs and ends at a 0.10T time read-in period thereafter to allow variation of approximately one-half time duration on either side of the approximate 5 percent interval spacing of a recorded interval pulse relative to a recorded outage pulse.

Figure 4:
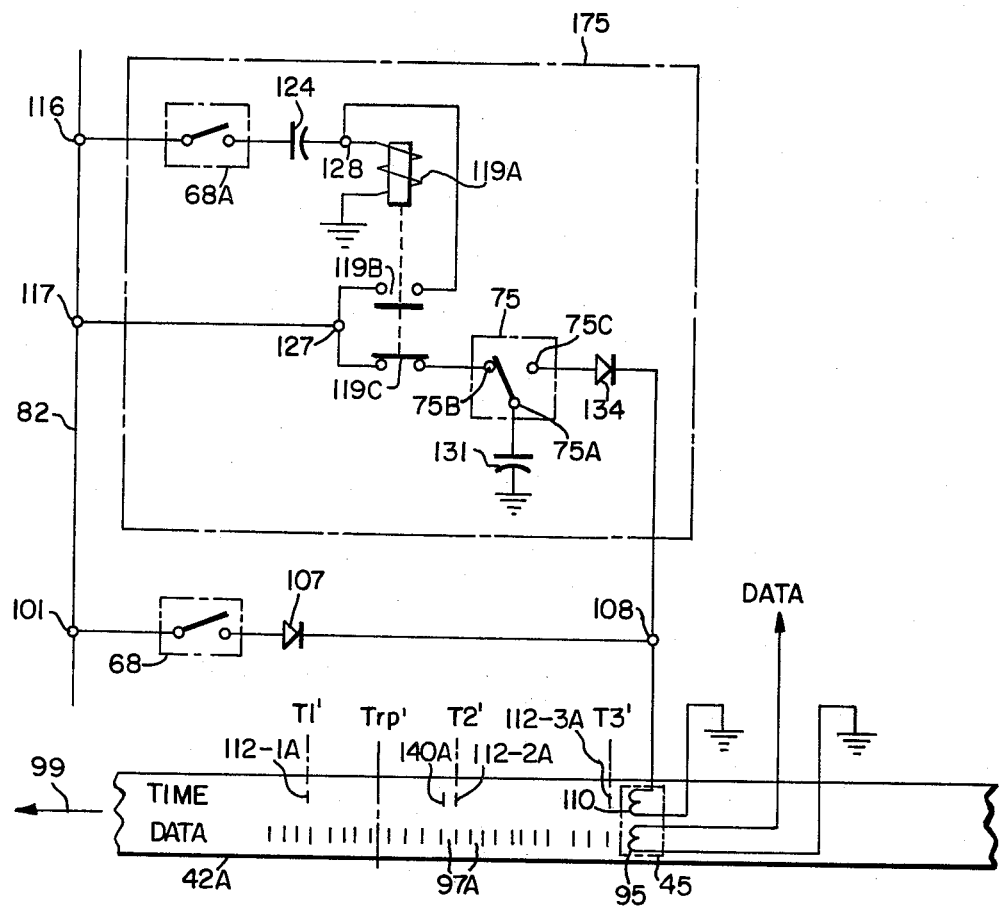
FIG. 4 is a fragmentary electric circuit diagram for replacing a portion of the circuit diagram illustrated in FIG. 2.

In FIG. 4, there is illustrated a fragmentary electrical circuit diagram of the recorder circuit shown in FIG. 2 including an alternative recorder outage indicating circuit 175 included with the broken line block which is to replace the circuit in the broken line block 115 in FIG. 2. The circuit 175 includes the microswitch 75 and the reed switch 68A included in the recorder mechanism shown in FIG. 1. The circuit 175 provides a recorded return-to-bias outage pulse 140A in a recording tape tape 42A after a time Trp when the power returns from a power outage condition. The pulse 140A is recorded at the predetermined position before an interval pulse but prior to the interval pulse 112-2A so as to be recorded in the same interval that an outage occurred rather than the following interval as described in connection with FIG. 2.

In the circuit 175, the reed switch 68A is connected in series with the capacitor 124 which is connected in series with the relay coil 119A. The holding relay conacts 119B are connected at the junctions 117 and 127 and across the switch 68A and the capacitor 124. The relay contacts 119C are connected at the junction 127 between junction 117 and the switch terminal 75B. The capacitor 131 is connected between the switch terminal 75A and the circuit ground and the switch terminal 75C is connected through the diode 134 to the junction 108 as in the circuit 115. The microswitch is normally positioned in the condition shown in FIG. 4 closing the switch terminals 75A and 75B.

In operation of the circuit 175, a tape 42A is recorded with data pulses 97A and time interval pulses 112-1A, 112-2A, and 112-3A at times T1', T2', and T3' corresponding to the recorded data and time interval pulses in the tape 42 shown in FIG. 2 and described hereinabove. The relay coil 119A is initially energized at the beginning of the recording period so that the contacts 119B are closed and the contacts 119C are opened. This isolates the capacitor 131 from the supply conductor 82. At a time after the time T1' when the interval pulse 112-1A is recorded, a power outage occurs as described in the operation of FIG. 2 and ends at the time Trp'. The movement of the tape 42A stops during the outage condition.

Upon the return to power at the time Trp', the coil 119A is not energized immediately due to the open switch contacts 119B and switch 68A being open. The capacitor 124 guards against momentary outages deenergizing the coil 119A. During this initial delay the contacts 119C remains closed so as to charge the capacitor 131 since the conductor 82 is again energized.

When the microswitch 75 is operated the switch terminal 75C is connected to the terminal 75A to discharge the capacitor 131 through the recording head coil 110. This produces the outage pulse 140A at a short instant prior to the time T2'. When the reed switch 68A closes at the time T2', the time interval pulse 112-3A is recorded and relay coil 119A energized. The contacts 119B close and the contacts 119C open to latch the coil 119A to an energized state.

Accordingly, the outage pulse 140A is recorded between the interval pulses 112-1A and 112-2A ocurring at time T1' and T2' rather than prior to the interval pulse 112-3A and after the interval in which the outage condition occurred as provided in the recorder outage indicating circuit 115 illustrated in FIG. 2.

A translator system provided in accordance with the system 141 in FIG. 3 processes the recorded outage pulse 140A as described for pulse 140 in FIG. 3.

While the invention described hereinabove is in accordance with the preferred embodiments disclosed, other alternative embodiments may be made without departing from the spirit and scope of our invention.

We claim:

1. A data recorder for recording metering information of a measured quantity subject to an interruption during outage conditions, comprising:
   a data input for receiving pulses responsive to predetermined amounts of a measured quantity;
   a time impulse control means actuated at regular time intervals;
   an outage detector including a switching control means having one conductive condition in response to presence of said measured quantity and opposite conductive condition in response to the absence of said measured quantity;
   a data recording circuit means connected to said data input to generate data recording pulses;
   a time recording circuit means including said time impulse control means for generating time interval pulses in response to each actuation of said time impulse control means;
   an outage indicating circuit means including said switching control means, said outage indicating circuit means being connected to said time recording circuit means to generate a separate outage pulse in said time recording circuit in response to said switching control means being operated between said one and said opposite conductive conditions such that said outage pulse is produced in said time recording circuit means in a predetermined relationship prior to a time interval pulse generated subsequent to an outage condition in said measured quantity.

2. The data recorder as claimed in claim 1 including an outage impulse control means connected in said outage indicating circuit, said outage impulse control means being actuated at the same regular time intervals as said time impulse control means with a predetermined time period occurring between the times that said time impulse control means and said outage impulse control means are actuated, said outage impulse control means being effective to initiate said outage pulse only in response to said switching control means being operated between said one and said opposite conductive conditions.

3. The data recorder as claimed in claim 2 including a magnetic tape recording medium; a data magnetic recording head means connected in said data recording circuit for producing recorded data pulses in one track of said recording medium; a time magnetic recording head means connected to said time recording circuit means for producing recorded time interval pulses and outage pulses in a common second track of said recording medium.

4. The data recorder as claimed in claim 3 including a timing mechanism having a timing motor and a cam rotated by said motor with said time impulse control means and said outage impulse control means both being actuated at different predetermined rotated positions of said cam.

5. The data recorder as claimed in claim 4 wherein said pulses received at said data input are responsive to predetermined amounts of electric power being measured by a watthour metering device initiating said data pulses, and wherein said switching control member is energized and deenergized by the electric power being measured to establish operation between said first and second conductive states in response to an outage condition.

6. The data recorder as claimed in claim 5 wherein said time impulse control means includes a first switch operated by a cam follower engaging said cam for actuation at said regular time intervals, and wherein said outage impulse control means includes a second switch operated by an actuating means engaging said cam and being disposed arcuately from said cam follower such that said second switch is actuated at a predetermined short time period immediately prior to the time that said first switch is actuated.

7. The data recorder as claimed in claim 6 wherein the actuating means of said second switch is displaced arcuately away from the cam follower means of said first switch in an opposite direction from the direction of rotation of said cam such that the second switch is actuated at a predetermined short time period in the order of 5 percent of the time period between successive operations of said first switch prior to the instant that said first switch is actuated during each rotation of said cam.

8. The data recorder as claimed in claim 6 including a first capacitor means connected in said time recording circuit means and further including a second capacitor connected in said outage indicating circuit means such that said first capacitor is discharged through said time recording head means when said first switch is actuated and said second capacitor is discharged through said time recording head means upon said second switch being actuated following operation of said switching control means in response to an outage condition.

* * * * *

Notice of Adverse Decision in Interference

In Interference No. 100,498, involving Patent No. 3,913,129, C. J. Snyder, A. H. Maxwell, Jr., and W. P. Doby, OUTAGE INDICATING APPARATUS FOR METER TELEMETRY SYSTEMS INCLUDING DATA RECORDERS, final judgment adverse to the patentees was rendered Apr. 29, 1983, as to claim 1.

[*Official Gazette November 8, 1983.*]